March 22, 1966 D. G. SANDERS ETAL 3,242,053
NUCLEAR POWER PLANT SYSTEM
Filed Dec. 8, 1960
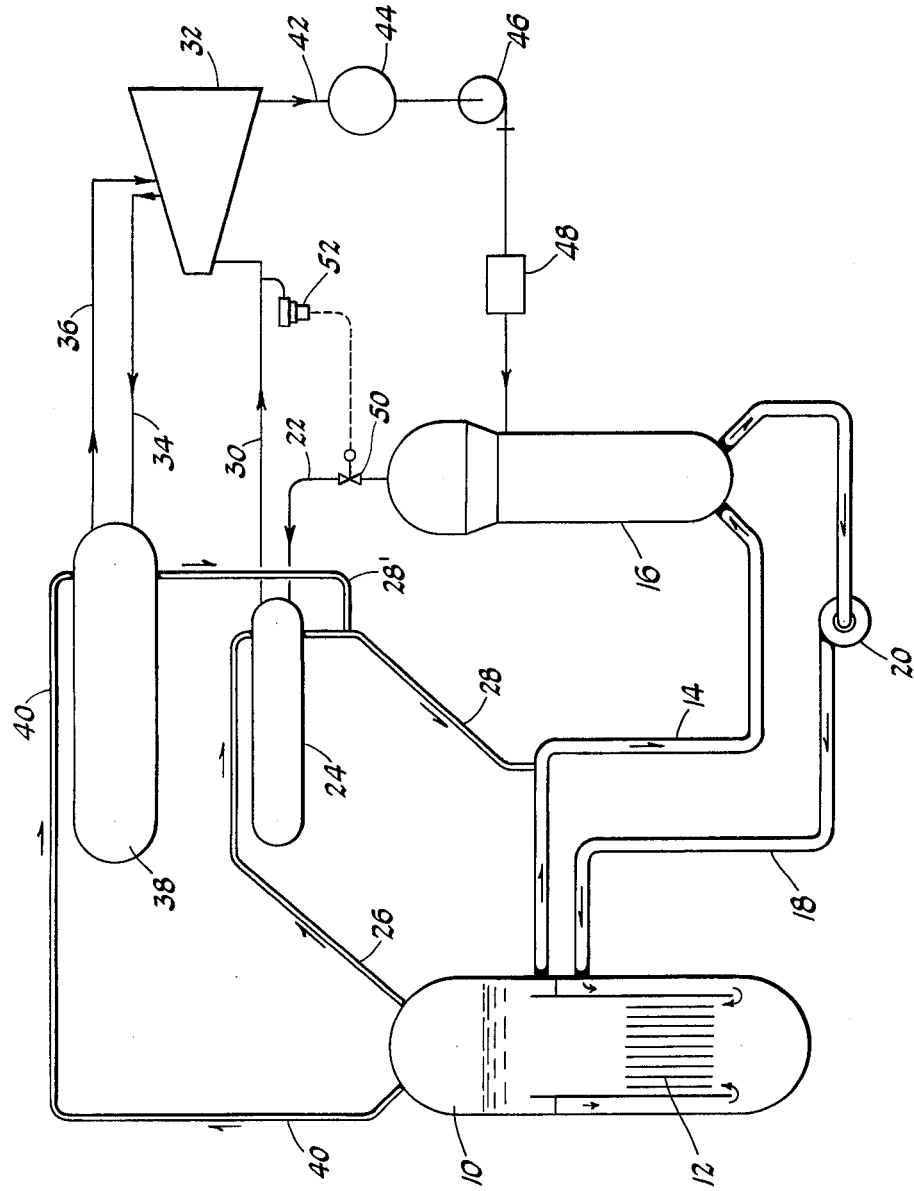
INVENTORs:
DONALD G. SANDERS
PAUL C. ZMOLA
BY Eldon H. Luther
ATTORNEY United States Patent Office 3,242,053
Patented Mar. 22, 1966

3,242,053
NUCLEAR POWER PLANT SYSTEM
Donald G. Sanders, West Hartford, and Paul C. Zmola, Bloomfield, Conn., assignors to Combustion Engineering, Inc., a corporation of Delaware
Filed Dec. 8, 1960, Ser. No. 74,621
14 Claims. (Cl. 176—56)

This invention relates generally to power plant systems and a method of operating the same which employ nuclear reactors as the heat source and a steam turbine as the power machine with the invention being particularly related to a system operating on an indirect cycle with a reactor being of the heterogeneous type moderated and cooled by a hydrogenous fluid and with the system producing superheated steam which is supplied to the turbine with the steam supply being maintained at a generally constant pressure and in a superheated state throughout a substantial load range on the turbine.

One of the major cost items in a power plant system, whether it be a system employing a fossil fired boiler or a nuclear reactor, is the turbine generator unit which forms a part of the system.

As the art has developed the turbines employed in these power plants have been progressively improved in efficiency so that a modern turbine is a very efficient machine with the cost of these efficiently operating turbines per unit of power output having been made progressively less with the improvements in their design and construction. In order to take advantage of these savings due to the advances in turbine technology it is essential that steam delivered to the turbine be not only at a relatively high pressure but that it contain a sufficient degree of superheat so that only a minor percentage of water be required to be handled by the turbine. As for example the steam issuing from the high pressure stage, if a reheat cycle is employed is preferably either dry or contains only a small percentage of moisture while the discharge from the final stage should contain not more than 10 to 14 percent moisture.

It has heretofore been the practice in power plant systems employing nuclear reactors to supply saturated steam to the high pressure stage of the turbine. This is a step backward in turbine technology of about 40 years and imposes a severe penalty on the entire system from an economic standpoint both with regard to efficiency of operation and with regard to the capital cost of the equipment. Large turbines operating with saturated steam supplies cannot take advantage of the turbine cost savings that have been developed over the years and are associated with modern steam turbine practice. The difference in cost of a modern turbine operating with superheated steam and a turbine operating with saturated steam which must necessarily handle large quantities of water is very substantial.

While efforts are being made to provide superheated steam by means of a nuclear reactor, i.e. to superheat in the reactor, this requires a substantial advance in reactor technology over that which has been presently developed.

It is the purpose of the present invention to provide a power plant system which has an overall favorable heat rate, which develops superheated steam that is delivered to the turbine, and which employs a nuclear reactor as the heat source with the reactor being of a known type and employing known reactor technology for its design and construction. By means of this system, advantage may be taken of the cost savings realized by modern steam turbine design and practice and with the system of the invention the safeguards with regard to confinement of radioactivity associated with the indirect system are realized and the heat exchange arrangement is such that a highly efficient operation is provided.

In accordance with the invention there is provided a nuclear reactor which is cooled and moderated by hydrogenous fluid with this fluid preferably being light water. The reactor is operated so that it is self-pressurizing with a portion of the power developed by the reactor being utilized for the production of vapor. The reactor has associated therewith a circulating system for the moderating-coolant which takes this fluid in a liquid state and at saturation temperature and passes it through a steam generator, which is in the form of an indirect heat exchanger, and conveys the moderator-coolant from this heat exchanger in a subcooled condition back to the reactor for passage up through the core thereof. This circulating system forms the primary loop of the system. In the steam generator steam is developed in the secondary loop, with this steam being conveyed to a superheater, which is also an indirect heat exchanger, which receives as its heating medium vapor from the reactor. This vapor is condensed upon being passed through the superheater with the heat of condensation being imparted to the secondary steam which passes through this superheater. This secondary steam thus has a predetermined superheat imparted to it with this superheated steam being delivered to the high pressure end of the turbine. The cycle of the power plant may or may not employ a reheater and if such reheater is employed it also receives as its heating medium vapor from the reactor with this vapor being condensed in the reheater in the same manner as that in the superheater and thereby imparting heat to the steam passing through the reheater to superheat the same.

The pressure of the superheated steam delivered to the turbine is maintained constant by means of a control device which responds to this pressure and it is effective to control the pressure of the steam delivered to the superheater. This arrangement assures that the steam delivered to the turbine will be superheated over the range of operation of the system and it assures that the steam conditions in the turbine will remain generally constant. The reactor system is such that it is of a self-regulating nature so that the power output will, to a substantial extent, be automatically regulated in accordance with the demand on the turbine.

It is accordingly an object of this invention to provide an improved power plant system and method of operation employing a nuclear reactor as the heat source and a steam turbine as the power machine.

Other and further objects of the invention will become apparent to those skilled in the art as the rescription proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein the single figure is a diagrammatic representation of the system of the invention with this representation being in the nature of a flow sheet.

Referring now to the drawing, wherein like reference numerals are used throughout to designate like elements, the illustrative and preferred embodiment of the invention depicted therein includes the nuclear reactor 10 which is of the heterogeneous type having a core 12 that is made up of a number of elongated fuel elements that are retained in space relation so that a coolant may pass therebetween with the fuel elements having a nuclear fuel therein, as for example uranium oxide pellets disposed within stainless steel tubes. The reactor is cooled and moderated by a hydrogenous fluid and for economic reasons light water is the fluid that is preferably employed. The reactor is operated so that a portion of the heat developed in or the power output of the core is employed to generate steam while the remaining portion is employed to raise the temperature of the coolant-moderator from the subcooled condition at which it enters the reactor to generally the temperature of saturation. The steam that is developed is employed for self-pressurization of the primary system and is also employed as the medium for superheating the secondary steam.

The reactor has associated therewith a circlating system which includes outlet conduit 14, steam generator 16 and return conduit 18. Water which has been heated generally to saturation temperature is conveyed from the reactor through conduit 14 and into and through the steam generator 16. This steam generator is any well known type of indirect heat exchanger within which the primary reactor fluid may impart heat to the fluid in the secondary system with this latter fluid also preferably being water and with the secondary fluid being vaporized in this heat exchanger. The primary, reactor fluid leaves the steam generator 16 in a subcooled condition, passes through conduit 18, within which is disposed pump 20, and is returned to the reactor for passage up through the core thereof.

Secondary steam is conveyed from steam generator 16 through conduit 22 to the superheater 24 with this secondary steam being passed in indirect heat exchange relation with primary steam from the reactor in this superheater. The primary steam is conveyed to the superheater through conduit 26 with at least a major portion, and preferably all, of this steam being condensed in superheater 24 and with the condensate being conveyed to the circulating system of the reactor through discharge conduit 28. It is thus evident that the superheater 24 is also an indirect heat exchanger wherein the steam from the reactor is the heating medium while the secondary steam from generator 16 is the heated medium. In passing through the superheater 24 the secondary steam is superheated to a predetermined degree with this superheated steam being delivered through conduit 30 to the high pressure inlet of turbine 32. It will be appreciated that the pressure in the primary system is substantially higher than that in the secondary system so that the temperature of saturated steam in the reactor is substantially higher than that in the steam generator. As an example, the reactor pressure may be about 2000 lbs. per sq. in. while the pressure of the secondary steam in the steam generator may be about 1000 lbs. per sq. in.

It will be evident from the system as thus far explained that a combined energy cycle has been evolved, i.e. the heat imparted from the primary system to the secondary system to produce steam in the secondary system is sensible heat with this heat being that which is produced through the subcooling of the coolant-moderator passing through the primary system while the heat imparted from the primary system to the secondary system for superheating is latent heat with this heat being the heat of condensation resulting from condensing the steam supplied to the superheater from the reactor. This arrangement has a particular advantage in that it permits the achievement of maximum secondary steam temperature delivered to the turbine under the particular conditions of operation of the reactor with the temperature of the secondary steam approaching very closely the temperature of saturation of the coolant-moderator in the reactor or in other words the temperature of the saturated steam delivered from the reactor to the superheater. Furthermore this high temperature of the secondary steam is achieved with a superheater heat exchanger which may be relatively small. This is so because the temperature of the heating medium, i.e. the steam from the reactor, remains at the saturation temperature or in other words remains constant so that a substantial log. mean temperature differential is provided between the heating and the heated medium in the superheater as compared with the results that would be achieved if the temperature of the heating medium progressively decreased as it gave up heat to the secondary steam. Furthermore the rate of heat exchange is substantially higher under conditions where one of the fluids is being condensed than if such action were not taking place. In other words the rate of heat exchange is higher by having the primary steam being condensed in the superheater than if water or steam per se were being employed as the heating medium. These various effects combine to produce a very economical arrangement for superheating the secondary steam with the superheater being relatively small, giving a small pressure drop and providing structure which is relatively economical to manufacture.

As illustratively disclosed the system includes a reheater which receives steam from the turbine after it has passed through a portion thereof, as for example after it has passed through the high pressure stage of the turbine, and is effective to reheat the steam and redeliver it to the turbine in a reheated condition. The steam is conveyed from the turbine to the reheater through conduit 34 and from the reheater to the turbine through conduit 36. The reheater 38 may be of similar construction to the superheater 24 with it merely being an indirect heat exchanger and, as in the case of the superheater, the reheater 38 receives as its heating medium saturated steam from the reactor with this steam being conveyed through conduit 40. This saturated steam is condensed in the reheater with the heat of condensation being imparted to the steam that is being reheated and with the condensate being returned to the circulating system of the primary loop through the conduit 28'. The steam that is initially delivered to the reheater through conduit 34 may be slightly superheated or may be at its saturation temperature and contain a small percentage of moisture as for example 4 or 5 percent. In passing through the reheater the temperature of the steam is raised substantially so that when it is re-introduced into the turbine, such as at the inlet of the low pressure stage, it contains a substantial degree of superheat.

The steam exits from the turbine through conduit 42 with the steam then being in a condition where it contains a relatively minor percentage of water, such as 10 or 12 percent and with the steam being conveyed to the condenser 44. From the condenser the condensate is returned to the steam generator by pump 46 with the temperature thereof being raised by suitable feedwater heater 48 which may be of any desired form or construction and may receive steam for heating by bleeding the same from the turbine in known fashion.

Since a major portion of the power developed by the core of the reactor 10 is employed for generating steam the reactor has the property of self-regulation with the less power taken therefrom causing the power output thereof to automatically decrease while the more power taken therefrom causes the power output to automatically increase. This will become evident when it is considered what happens when the demand on the turbine and accordingly the steam demand decreases. When this happens a valve at the outlet of the steam generator, i.e. valve 50, will tend to close somewhat decreasing the steam delivered to the turbine. This control, as explained hereafter, is such as to maintain the throttle pressure at the turbine substantially constant over the load range of operation of the system. This decrease in steam flow from the steam generator results in a pressure build up on the secondary side of the steam generator. The associated rise in saturation temperature on the secondary side results in a decrease in the temperature difference between the primary and secondary side of steam generator 16. Since the total heat transfer surface and over-all transfer coefficients of this steam generator, of course, remain constant, a decrease in heat flow and hence in steam generation results. The decrease in heat flow, in turn, results in an increase in the primary water temperature leaving the steam generator and so a decrease in the subcooling of the water being returned to and entering the reactor core. This increase in primary coolant temperature results in a decrease in reactor power with this result being brought about by the net influence of negative moderator temperature, negative fuel temperature, and negative void coefficients of reactivity. Accordingly a decrease in demand on the turbine automatically decreases the power output of the reactor. A reverse process occurs when an increase in turbine demand is realized. Thus while control rods will be employed in the reactor, such not being shown since their use is well known and conventional, little movement of the rods is required under normal operating conditions and such movement as is required will be relatively slow so that a simple control rod operating arrangement may be provided. Furthermore, the system may be designed so as to be capable of taking a turbine trip without the scram of control rods or the dumping of steam to the condenser.

Additionally, with the arrangement of the invention, since there is a certain amount of boiling in the core, the limitation of a power excursion by the reactor will be achieved as in boiling reactor systems with this being an important safety factor.

The system is controlled in such a manner, as previously mentioned, that the pressure of the steam delivered to the turbine from superheater 24 is maintained generally constant. This result is achieved by means of the pressure sensor 52 which is responsive to the pressure at the turbine throttle and which provides a signal for the control of valve 50. This valve is controlled in such a manner as to maintain the throttle pressure constant. It is important to note that the valve 50 controls the pressure of the steam delivered to the superheater 24. By thus locating the valve, assurance is provided that the steam that is delivered to turbine 32 will be superheated over the entire load range of the turbine. This is so since the pressure of the secondary steam passing through the superheater 24 will not vary substantially so that it will be properly superheated during its traverse of the superheater. Furthermore since the steam pressure delivered to the superheater is generally constant, the piping and the heat exchanger itself may be designed for this pressure. This would not be the case if the control valve were placed downstream of the superheater. In this latter event the pressure of the primary steam in the superheater would vary and what is even more significant after expanding through the valve 50 the amount of superheat in the steam would be lost and the lower pressure steam would be delivered to the turbine in a wet condition.

Accordingly it will be seen that with the system of the present invention a power plant is provided which employs a nuclear reactor as the heat source with the reactor employing conventional reactor technology and with the system delivering superheated steam to the turbine and further with the system maintaining the pressure and also the temperature of the steam delivered to the turbine generally constant. This temperature control results from the characteristic of the reactor and the system. While the pressure in the reactor will vary somewhat with load changes this pressure will not be so significant as to change the saturation temperature more than a few degrees and since the steam delivered to the turbine relatively closely approaches the temperature of the primary steam delivered to the superheater this steam temperature of the secondary steam delivered to the turbine remains generally constant.

It will be seen that with the present invention, for a given design pressure of the reactor the maximum cycle temperature, i.e. temperature of the steam delivered to the turbine, is achieved. This result is brought about as a result of the reactor operating at saturated temperature with there being a certain amount of boiling in the reactor. It is further a result of the arrangement for superheating wherein the primary steam is employed as the heating medium whereby the heating medium remains generally at constant temperature and with the heat which it imparts to the secondary system being the heat of condensation and whereby as a result of this condensing action a high heat transfer rate is provided. It should further be brought out that of the total heat imparted from the primary to the secondary system a relatively minor portion is required to be imparted by means of the superheater with the major portion being imparted to the steam generator to evaporate the water of the secondary system to steam. By this arrangement a relatively high log. mean temperature difference may be provided in both the steam generator 16 and the superheater 24. The relatively high temperature differential in the superheater progressively diminishes as the secondary steam passes through the superheater with there being a very low temperature difference at the exit of this secondary steam from the superheater.

By regulating the temperature and pressure of the steam to the turbine in accordance to the invention the turbine is operated under constant conditions and as a result of the superheat these conditions approach the standard conditions of modern turbine practice so that the turbine does not have to handle large amounts of water and conventional turbine design and economies may be utilized.

The system accordingly provides a relatively high efficiency from a heat rate standpoint and employs the economies of the known and developed practices in both turbine and reactor design.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. In a power generating system employing a water cooled and moderated nuclear reactor within which boiling occurs and also employing a steam operated prime mover the method of operation comprising conveying heated water from the reactor and passing it in indirect heat exchange with a working fluid thereby evaporating a portion of such fluid, returning the subcooled water to the reactor, superheating said vapor by conveying steam from the reactor in indirect heat exchange relation with the vapor thus generated, returning the heating steam to the water portion, and conveying said superheated vapor to the prime mover as the motive fluid therefor.

2. The method of claim 1 including sensing the pressure of the vapor delivered to the prime mover and in response thereto regulating the pressure of the vaporized fluid prior to its passage in indirect heat exchange with the steam from the reactor to maintain the pressure of the vapor delivered from the superheater to the prime mover substantially less than the pressure at which said fluid is evaporated.

3. In a power generation system wherein superheated vapor is supplied to a turbine and where the heat source is a water cooled and moderated nuclear reactor the method of operation comprising passing the water through the reactor and heating the same, passing the heated water in a liquid state from the reactor in indirect heat exchange with a working fluid and vaporizing a portion of the latter, returning the then subcooled water to the reactor, conveying this vapor essentially free of liquid in indirect heat exchange relation with effluent from the reactor prior to the effluent otherwise transferring heat to the working fluid and raising the temperature of said vapor to a desired degree of superheat, conveying this superheated vapor to the turbine as the motive fluid, regulating the pressure of the vapor prior to its being superheated and in a manner such that the pressure of the vapor being superheated is maintained substantially lower than the pressure at which the working fluid is being vaporized.

4. A method as in claim 3 including regulating the pressure of the vapor as it egresses to the turbine to maintain the same essentially constant.

5. A power generation system comprising a nuclear reactor cooled and moderated by a hydrogenous fluid, a circulation system for circulating said fluid through the reactor in a liquid state, said system including a vapor generator wherein heat from said liquid is transferred to a working fluid vaporizing the same, a superheater receiving fluid from the reactor as the heating medium and vapor from the vapor generator as the heated medium and operative to superheat said vapor, a turbine receiving the superheated vapor from the superheater, means responsive to the pressure of the vapor delivered to the turbine, and means regulated by said pressure responsive means and operative to regulatingly throttle the vapor admitted to the superheater in a manner so the pressure of the vapor delivered to the turbine is controlled at a preselected level.

6. In combination a water moderated and cooled boiling water nuclear reactor, means operative to convey water from the reactor generally at saturation temperature to a steam generator wherein a working fluid is evaporated and said water is subcooled, means returning the water subcooled to the reactor for passage through the core thereof, means superheating vapor from the vapor generator by steam generated in the reactor and wherein at least a portion of the steam is condensed with this condensate being returned to the water circulating through the reactor, and a turbine operatively connected to receive the superheated vapor as the motive fluid therefor.

7. The organization of claim 6 including a reheater receiving as its heating medium vapor from the reactor and as its heated medium vapor from the turbine which is to be reheated.

8. The organization of claim 6 including means effectively responsive to the steam supplied to the turbine and operative to control the pressure of the vapor from the vapor generator entering the superheater so as to maintain the inlet pressure at the turbine generally constant over a substantial load.

9. The organization of claim 6 including a control system operative to insure that the vapor delivered to the turbine is maintained in a superheated condition said system including means responsive to the pressure of this vapor passing to the turbine and control means operative to reduce the pressure of the vapor as it enters the superheating means said control means being regulated by the pressure responsive means in such a manner as to maintain the pressure of the vapor passing to the turbine substantially lower than the pressure within the steam generator.

10. The organization of claim 6 wherein the superheating means is at a higher elevation than the reactor whereby the condensate formed in the superheater may be returned to the water circulating through the reactor by gravity.

11. A self-pressurizing, water moderated and cooled nuclear reactor, said reactor having a circulating system for circulating the moderator-coolant therethrough and including conduit means for withdrawing water generally at saturation temperature from the reactor, an indirect heat exchanger through which said water is passed and wherein a working fluid is evaporated and conduit means returning said water, subcooled, to the reactor, a superheater in the form of an indirect heat exchanger operative to superheat vaporized working fluid from the first mentioned heat exchanger, means conveying steam from the reactor to the superheater as the heating medium therefor, conduit means conveying this heating medium to the circulating system upstream of the first mentioned heat exchanger after passage through said superheater, conduit means conveying vapor from the first mentioned heat exchanger to the superheater for passage therethrough wherein the same is superheated, a turbine connected to receive said superheated vapor from said superheater and means operative to control the pressure of the vapor entering the superheater in a manner to maintain said pressure lower than the pressure within the working fluid evaporator.

12. The method of power generation comprising imparting heat to a liquid hydrogenous fluid through the fission of a nuclear fuel, evaporating a portion of said fluid by said heat, creating a pressure on said fluid by said vapor, imparting heat from the liquid portion of the fluid to a working fluid and evaporating a portion of the latter fluid, passing the vaporized working fluid in heat exchange relation with the vaporized hydrogenous fluid and imparting heat to the vaporized working fluid to superheat the same, conveying this superheated vapor to a prime mover as the motive fluid therefor, regulatingly restricting the flow of the vaporized working fluid prior to its passage in heat exchange relation with the vaporized hydrogenous fluid and effectively in response to the pressure of the superheated fluid being conveyed to the prime mover and in a manner to maintain this pressure at its desired value.

13. The method of claim 12 including conveying the fluid delivered to the prime mover, after passage through a portion of the prime mover, again in heat exchange relation with vaporized hydrogenous fluid to reheat the same to a desired temperature and thereafter reconveying this reheated fluid to the prime mover as the motive fluid therefor.

14. A self-pressurizing, water moderated and cooled nuclear reactor, said reactor having a circulating system for circulating the moderator-coolant therethrough and including conduit means for withdrawing water generally at saturation temperature from the reactor, an indirect heat exchanger through which said water is passed and wherein a working fluid is evaporated and conduit means returning said water, subcooled, to the reactor, a superheater in the form of an indirect heat exchanger operative to superheat vaporized working fluid from the first-mentioned heat exchanger, means conveying vapor from the reactor to the superheater as the heating medium therefor, conduit means conveying said heating medium to the circulating system upstream of the first-mentioned heat exchanger after passage through said superheater, conduit means conveying working fluid vapor from the first-mentioned heat exchanger to the superheater for passage therethrough wherein the same is superheated, a turbine connected to receive said superheated working fluid vapor from the superheater as the motive fluid therefor, means upstream of said superheater effective to regulate the pressure of the working fluid vapor entering the superheater in a manner to maintain the pressure of the working fluid vapor delivered to the turbine generally constant over a substantial load range, reheater means receiving as its heating medium vapor generated in the reactor and as its heated medium motive fluid from the turbine, means conveying reheated fluid from the reheater to the turbine, and means conveying the reheater heating medium to the circulating system upstream of the first-mentioned heat exchanger after passage through the reheater.

References Cited by the Examiner

UNITED STATES PATENTS

| | | | |
|---|---|---|---|
| 2,865,827 | 12/1958 | Dwyer | 122—32 |
| 3,029,197 | 4/1962 | Untermyer | 176—55 |
| 3,069,342 | 12/1962 | Flatt | 176—60 X |

FOREIGN PATENTS 841,920  7/1960  Great Britain.

OTHER REFERENCES

Nucleonics: December 1955, pp. 42–45, MacPhee.

Problems in Nuclear Engineering, Elliott et al., vol. 1, 1955, pp. 285–291.

Atomics and Nuclear Energy, vol. 9, No. 2, Feb. 1, 1958, pp. 62–66.

REUBEN EPSTEIN, *Primary Examiner.*

CARL D. QUARFORTH, LEON D. ROSDOL,
*Examiners.*